Sept. 21, 1948.        R. GROETCHEN        2,449,937
ROTARY COOKER
Filed Oct. 30, 1944
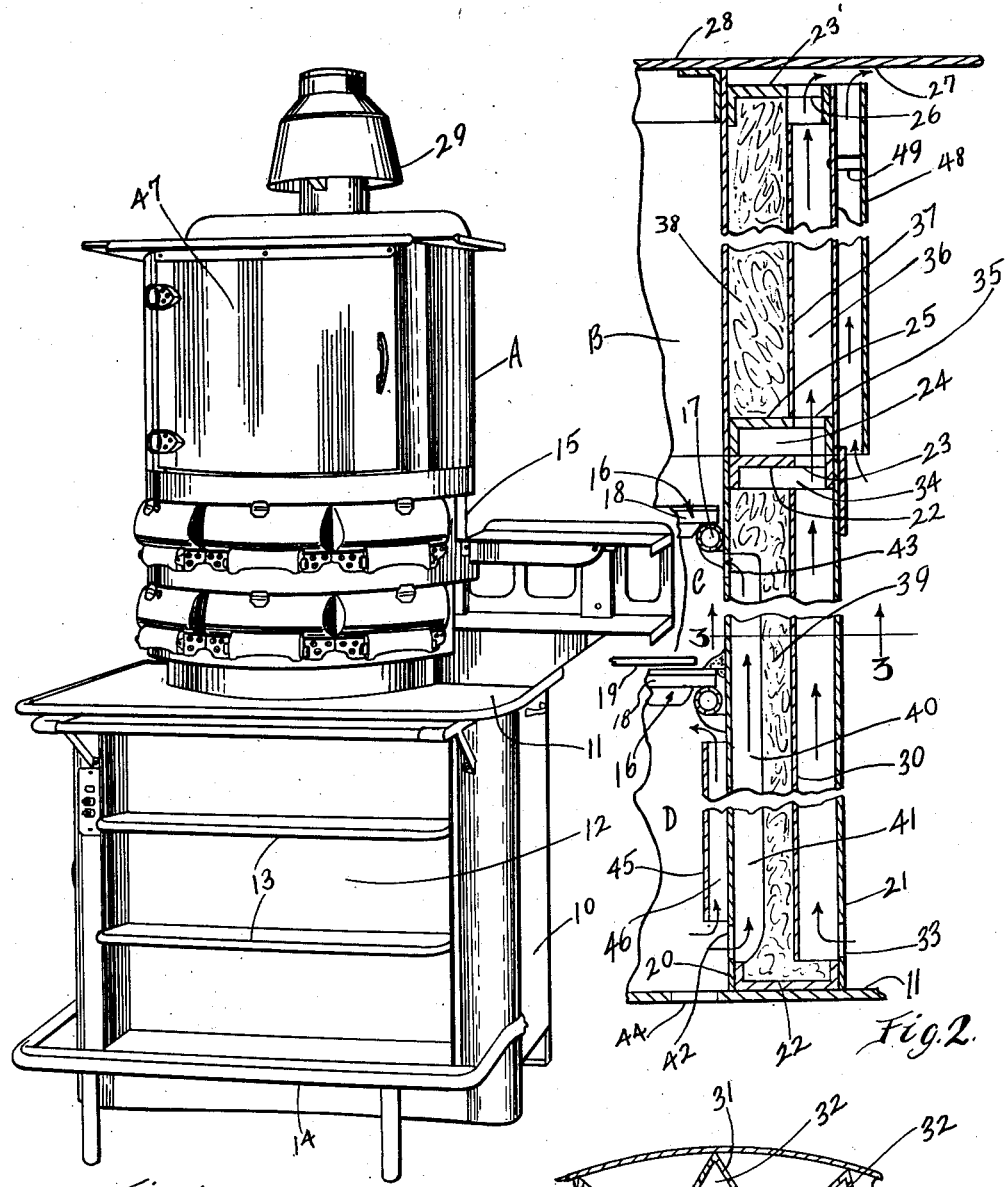
Fig.1.    Fig.2.
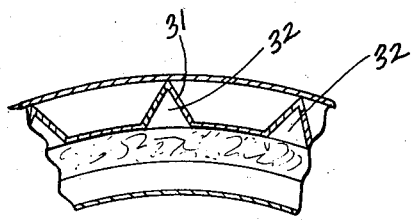
Fig.3.    INVENTOR.
Richard Groetchen
BY
His Attorney Patented Sept. 21, 1948

2,449,937

UNITED STATES PATENT OFFICE 2,449,937

ROTARY COOKER

Richard Groetchen, Chicago, Ill.

Application October 30, 1944, Serial No. 560,982

3 Claims. (Cl. 126—273)

This invention relates to certain novel improvements in rotary cookers. And an object of the invention is to provide for maintaining the walls of the cooker at low temperature.

In as much as the cookers of the type herein referred to are continuously heated for cooking purposes and during the cooking period, it had been found that the walls of the cooker become excessively hot, radiating undue heat to the surrounding space, for instance, the room where the cooker is located, and subject the operator to constant danger of his hands coming into contact with the hot walls. To this end the invention has for its object the provision for maintaining the cooker walls at a low temperature, employing for that purpose an arrangement which is simple and yet highly efficient in use, all without retarding the cooking operation or interfering with the required heat for cooking and broiling. The present invention constitutes an improvement over that shown in my pending application, Serial No. 538,613, filed for Letters Patent on a Cooker, now Patent No. 2,419,261, dated April 22, 1947.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the cooker embodying the invention;

Fig. 2 is a fragmentary vertical sectional detail view through the rear wall portion A of the cooker; and Fig. 3 is a fragmentary sectional detail view taken substantially on line 3—3 of Fig. 2.

The several objects and advantages of this invention will be best appreciated by an understanding of the construction and operation of the rotary cooker as shown in the drawing and as described hereinafter. This cooker is constructed substantially similar to that shown in my pending application, Serial No. 538,613, hereinbefore referred to, and the cooker illustrated in the drawings of this application includes a base 10 having a table top 11 with a compartment 12 therebelow equipped with suitable shelving 13. A suitable foot rail 14 is shown associated with the base 10. Upon and above the table top 11 is the rotary cooker proper, comprising an enclosure providing a housing 15 divided into compartments B, C and D, the compartment B constituting the warming compartment and the compartment C a cooking compartment, while the compartment D constitutes a broiling compartment. These compartments are separated by burner structures 16, each comprising a fuel supply conduit 17 and a plurality of ceramic plates 18, similar to those shown and described in my pending application, Serial No. 512,157, filed November 29, 1943, now Patent 2,429,022 dated October 14, 1947, on a Heat radiating device. Above these ceramic plates there are arranged the usual grid plates 19, similar to those shown in my pending application, Serial No. 451,263, filed July 17, 1942, for patent on a Burner structure, now Patent 2,375,412, May 8, 1945.

The wall A of the housing 15 comprises an inner wall plate 20 and an outer wall plate 21 substantially spaced from each other by spacing rings 22. The upper ring 22 has formed therein a plurality of openings 23 which communicate with a space 24 provided by a spacing ring 25 arranged within the wall A intermediate the top and bottom portions thereof. The upper end portions of the wall plates 20 and 21 are maintained in spaced relation by means of the spacing ring 23' having a plurality of openings 26 formed therein communicating with an outlet space 27 adjacent the top wall 28 of the housing 15, which top wall 28 carries a proper vent 29.

Arranged in the lower section of the wall A between the wall plates 20 and 21 is a partition 30 providing a plurality of corrugations 31, with the corrugations providing passages 32 communicating at their lower end portions with a plurality of openings 33 formed circumferentially with respect to the wall plate 21. These passages 32 communicate with a space 34 beneath the upper spacer ring 22 and from thence with the openings 23 and 35, the latter being formed in the spacer ring 25. These openings 35 communicate with vertical passages 36 provided by a corrugated partition 37 similar to the corrugated partition 30. The arrangement is such that cool air will find entrance into the passages 32 through the openings 33, and by convection will pass upwardly through these passages 32 through the openings 23 and 35 and then through the passages 36, through the openings 26, and then exterior of the wall from the space 27. In this manner the outside wall A of the housing 15 is constantly being subjected to ventilation. Between the wall plate 20 and partition 37, above the spacer ring 25 is confined rock wool 38 for insulation purposes. Between the spacer rings 22 there is arranged a partition 39 of an asbestos packing, and this partition has a cut-out portion 40 to provide an annular passage 41 having communication at its lower end with openings 42 and at its upper end with openings 43 adjacent the burner structure including the ceramic plates 18. The arrangement is such that cool air is drawn through openings 44 formed in the table top 11 and communicating with the open compartment 12, and conducted upwardly through the passages 41 for exit through the openings 43, thus supplying the burner structure with ample oxygen, thereby greatly increasing the heating qualities of this burner structure. Likewise, there is provided between the table top 11 and the lower of the burner structures 16, an annular corrugated wall 45, the corrugations providing a plurality of passages 46, terminating short of the adjacent burner structure of the burner structures 16 and short of the table top 11. The arrangement is such that air will be taken up through the passages 46 and be discharged adjacent the adjacent burner structure 16, thereby furnishing that burner structure with the necessary degree of oxygen for proper heating and burning operations.

To complete the invention, the upper portion of the housing 15 is encircled, from points beginning on opposite sides of a door 47 which closes a door opening leading to the compartment B, by a wall plate 48 spaced from the wall plate 21 by suitable spacers 49, thus providing a vertical passage for air for maintaining the walls providing the compartment B at a harmless temperature.

It is apparent from the description thus set forth, that without any material increase in the area or size of the rotary cooker shown and described in my pending application, Serial No. 538,613, now Patent No. 2,419,261, dated April 22, 1947, I have provided a very simple and effective arrangement for circulating air through the walls of the cooker thereby to maintain the heat of the exterior walls of the cooker at a safe temperature.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A cooker comprising a housing, a burner element arranged in said housing, said housing including a wall structure comprising inner and outer wall plates arranged in spaced relation with respect to each other and a top wall providing together with said wall structure an outlet at the upper portion of said housing, a partition arranged between said wall plates, one of said wall plates having openings at the lower end thereof communicating with passages provided by said one of said wall plates and said partition, the upper ends of the passages communicating with the outlet beneath the top wall of said housing, a packing arranged between the inner wall and said partition and having passages formed therein communicating with the interior of said housing at the lower interior portion thereof and at a point below said burner element.

2. A cooker comprising a housing, a burner element arranged in said housing, said housing including a wall structure comprising inner and outer wall plates arranged in spaced relation with respect to each other and a top wall providing together with said wall structure an outlet at the upper portion of said housing, a partition of corrugated formation arranged between said wall plates, one of said wall plates having openings at the lower end thereof communicating with passages provided by the corrugations of said partition, the upper ends of the passages communicating with the outlet beneath the top wall of said housing, a heat-retaining partition arranged between said corrugated partition and the inner wall plate and providing together with the inner wall plate passages communicating with the interior of said housing at the lower interior portion thereof and at a point below said burner element.

3. A cooker comprising a housing, a burner element arranged in said housing, said housing including a wall structure comprising inner and outer wall plates arranged in spaced relation with respect to each other and a top wall providing together with said wall structure an outlet at the upper portion of said housing, a partition arranged between said wall plates, one of said wall plates having openings at the lower end thereof communicating with passages provided by said one of said wall plates and said partition, the upper ends of the passages communicating with the outlet beneath the top wall of said housing, a packing arranged between the inner and outer walls and having passages formed therein communicating with the interior of said housing at the lower interior portion thereof and at a point below said burner element, and a shell surrounding the upper portion of said housing exteriorly and providing a vertical air passage communicating with the outlet beneath the top wall of said housing.

RICHARD GROETCHEN.

REFERENCES CITED

The following references are of record in the file of this patent:

UNITED STATES PATENTS

| Number | Name | Date |
|---|---|---|
| 873,558 | Kingsland | Dec. 10, 1907 |
| 979,413 | Best | Dec. 27, 1910 |
| 1,002,716 | Lowrie | Sept. 5, 1911 |
| 1,011,698 | Woollett | Dec. 12, 1911 |
| 1,079,084 | White | Nov. 18, 1913 |
| 1,088,849 | Syvertsen | Mar. 3, 1914 |
| 1,316,976 | Reeve | Sept. 23, 1919 |
| 1,342,991 | Erskine | June 8, 1920 |
| 1,371,057 | Russell | Mar. 8, 1921 |
| 1,444,476 | Mendal | Feb. 6, 1923 |
| 1,634,543 | Hyatt | July 5, 1927 |
| 1,764,595 | Anderson | June 17, 1930 |
| 2,170,409 | Hoffman et al. | Aug. 22, 1939 |
| 2,180,563 | Taylor | Nov. 21, 1939 |
| 2,217,059 | Klute | Oct. 8, 1940 |
| 2,222,436 | Leonard | Nov. 19, 1940 |

FOREIGN PATENTS

| Number | Country | Date |
|---|---|---|
| 1,125 | Great Britain | 1901 |
| 9,162 | Great Britain | 1906 |
| 445,353 | Great Britain | Apr. 6, 1936 |
| 530,987 | Germany | Aug. 3, 1931 |
| 634,150 | France | Nov. 8, 1927 |